US011977199B2

(12) United States Patent
Lee et al.

(10) Patent No.: US 11,977,199 B2
(45) Date of Patent: May 7, 2024

(54) DEVICE FOR EVALUATING CHARACTERISTICS OF TARGET GROUND CONTAINING METAL COMPONENT

(71) Applicant: Korea University Research and Business Foundation, Seoul (KR)

(72) Inventors: Jong-Sub Lee, Seoul (KR); Sang-Yeob Kim, Seoul (KR); Nam-Sun Kim, Seongnam-si (KR); Joon-Ki Chun, Incheon (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 395 days.

(21) Appl. No.: 17/289,305

(22) PCT Filed: Oct. 26, 2020

(86) PCT No.: PCT/KR2020/014656
§ 371 (c)(1),
(2) Date: Apr. 28, 2021

(87) PCT Pub. No.: WO2021/091137
PCT Pub. Date: May 14, 2021

(65) Prior Publication Data
US 2022/0308255 A1 Sep. 29, 2022

(30) Foreign Application Priority Data
Nov. 5, 2019 (KR) .................. 10-2019-0140508
Aug. 25, 2020 (KR) .................. 10-2020-0107102

(51) Int. Cl.
*G01V 11/00* (2006.01)
*G01V 1/28* (2006.01)
*G01V 1/30* (2006.01)

(52) U.S. Cl.
CPC .......... *G01V 11/002* (2013.01); *G01V 1/284* (2013.01); *G01V 1/303* (2013.01); *G01V 1/306* (2013.01);
(Continued)

(58) Field of Classification Search
CPC .............. G01V 11/002; G01V 1/284
(Continued)

(56) References Cited

U.S. PATENT DOCUMENTS 5,136,249 A * 8/1992 White ............... G01R 27/06
324/642
5,773,750 A * 6/1998 Jae ................. F42D 3/00
102/302

FOREIGN PATENT DOCUMENTS

JP 6-74933 A 3/1994
JP 2018-72052 A 5/2018
KR 10-0919485 B1 9/2009

OTHER PUBLICATIONS

Jinho Park et al., "Utilization of Induced Polarization and Electrical Resistivity for Identifying Rock Condition," Journal of the Korean Society of Civil Engineers, Jun. 2016, pp. 493-502, vol. 36, No. 3, Korean Society of Civil Engineers, with English Abstract.
(Continued)

Primary Examiner — Vincent Q Nguyen
(74) Attorney, Agent, or Firm — Hauptman Ham, LLP

(57) ABSTRACT

A device for evaluating characteristics of a target ground containing a metal component is proposed. The device includes a penetration probe having a main frame and a pair of side frames respectively installed at opposite side ends of the main frame, wherein each side frame has a lower end thereof extending downward from the main frame; a plurality of electrodes installed to be exposed to outside on the main frame; an electrode measurement part for measuring apparent chargeability of the target ground by applying
(Continued)

power for measurement to the plurality of electrodes; and a main processor for calculating a weight ratio of a metal component of the target ground on the basis of the apparent chargeability measured by the electrode measurement part and calculating a volume ratio of the metal component of the target ground on the basis of the calculated weight ratio of the metal component.

11 Claims, 4 Drawing Sheets

(52) U.S. Cl.
CPC ...... *G01V 2210/62* (2013.01); *G01V 2210/72* (2013.01)

(58) Field of Classification Search
USPC .......................................... 324/325, 338–340
See application file for complete search history.

(56) References Cited

OTHER PUBLICATIONS

Bitnarae Kim et al., "The Principles and Practice of Induced Polarization Method," Geophysics and Geophysical Exploration, 2017, pp. 100-113, vol. 20, No. 2, with English Abstract.

\* cited by examiner

US 11,977,199 B2

DEVICE FOR EVALUATING CHARACTERISTICS OF TARGET GROUND CONTAINING METAL COMPONENT

CROSS-REFERENCE TO RELATED APPLICATION

The present application is a national stage filing under 35 U.S.C § 371 of PCT application number PCT/KR2020/014656 filed on Oct. 26, 2020 which is based upon and claims the benefit of priorities to Korean Patent Application No. 10-2019-0140508, filed on Nov. 5, 2019; and Korean Patent Application No. 10-2020-0107102, filed on Aug. 25, 2020, in the Korean Intellectual Property Office, which are incorporated herein in their entireties by reference.

TECHNICAL FIELD

The present disclosure relates to a device for evaluating characteristics of a target ground containing a metal component and, more particularly, to a device for evaluating characteristics of a target ground containing a metal component, the device being able to measure the characteristics of the target ground containing the metal component such as iron.

BACKGROUND ART

In recent years, as land development continues to progress, construction work for civil engineering, building, and environment-related facilities has faced a situation where it is difficult for the construction work to be done only on good ground. In other words, the number of cases is increasing day by day, wherein the construction work must be carried out even at a site under adverse conditions such as a coastal area, a mountainous area, a rocky area, a landfill site, and an urban area near existing structures, which was excluded when selecting a location for a conventional construction project.

Accordingly, acquisition and evaluation of geotechnical information through accurate geotechnical surveys are required in order to safely and economically construct structures such as a building. An objective of such a geotechnical survey is to prepare basic data necessary for constructing and maintaining the structures as safe and economical as possible, for example, the basic data necessary for computing the characteristics of the ground, the states of the strata, and the amount of settlement.

Such geotechnical survey methods are generally divided into a field test and an indoor test. The field test is a process in which test equipment such as a measuring probe for a test is installed in a relevant ground to obtain internal conditions of the ground or other necessary information. In addition, the indoor test is to acquire a sample that may represent the characteristics of a target ground, so as to transport the sample to a laboratory and conduct various necessary tests and analysis in the laboratory.

Meanwhile, as a probe for the field test, a ring-type speed measuring probe has been proposed. However, the ring-type speed measuring probe has a disadvantage in that when the probe penetrates into a hard clay ground, the soil is compacted in the ground. Since there occurs a disturbance in the soil when compacted, it is impossible to accurately measure the characteristics of the soil.

Accordingly, in Korea Patent No. 10-0919485, filed and registered by the applicant of the present disclosure, "FORK BLADE TYPE FIELD SHEAR WAVE VELOCITY PROBE" has been proposed, wherein as a probe has structural rigidity, there is no deformation due to pressure generated during penetration, and in particular, the probe is able to accurately evaluate the characteristics of soft ground or ground having moderate strongness.

However, including the Korea Patent described above, the existing methods for probing the characteristics of a target ground all have a problem in that a metal component such as iron contained in the target ground was not considered in the probing methods.

In waste storage dams of a metal mine, volcanic grounds, etc., a considerable amount of a metal component is present inside the target ground. Since the metal component influences the evaluation of characteristics of the target ground, when not considering these problems, the accuracy of characteristics evaluation is deteriorated.

For example, when speed of compressional wave is used in evaluating the groundwater level or water content characteristics, the speed of compressional wave in a soil component is 1,500 m per second or more, whereas the speed of compressional wave in ground containing a metal component varies depending on the amount or saturation of the metal component, and thus there is a problem in that it is difficult to accurately evaluate the groundwater level or water content characteristics.

DISCLOSURE

Technical Problem

Accordingly, the present disclosure has been provided to solve the above problems, and an objective of the present disclosure is to provide a device for evaluating characteristics of a target ground containing a metal component, the device being able to more accurately evaluate the characteristics of a target ground containing the metal component by means of reflecting the presence of the metal component and the amount of the metal component.

Technical Solution

According to the present disclosure, the above objective may be achieved by a device for evaluating characteristics of a target ground containing a metal component, the device including: a penetration probe having a main frame and a pair of side frames respectively installed at opposite side ends of the main frame, wherein each side frame has a lower end thereof extending downward from the main frame; a plurality of electrodes installed to be exposed to outside on the main frame; an electrode measurement part for measuring apparent chargeability of the target ground by applying power for measurement to the plurality of electrodes; and a main processor for calculating a weight ratio of the metal component of the target ground on the basis of the apparent chargeability measured by the electrode measurement part and calculating a volume ratio of the metal component of the target ground on the basis of the calculated weight ratio of the metal component.

Here, the electrode measurement part may measure the apparent chargeability through a time domain induced polarization probe method using four electrodes.

In addition, the weight ratio of the metal component may be subjected to a type of the metal component, so as to be proportional to the apparent chargeability, and the volume ratio of the metal component may be calculated based on the weight ratio of the metal component, specific gravity of the metal component, and specific gravity of a soil component of the target ground.

In addition, the main processor may calculate the weight ratio of the metal component through Equation m=k·IC (where, M is the apparent chargeability, IC is the weight ratio of the metal component, and k is a constant that varies depending on the type of the metal component).

The main processor may calculate the volume ratio of the metal component through Equation $$f = \frac{1}{1 + \left(\frac{1}{IC} - 1\right)\frac{G_I}{G_S}}$$

(where, f is the volume ratio of the metal component, $G_I$ is specific gravity of the metal component, and $G_S$ is specific gravity of the soil component).

The device for evaluating characteristics of a target ground containing a metal component may further include: a plurality of TDR probes installed to be exposed to the outside on the main frame; and a TDR measurement part for measuring a relative permittivity of the target ground through the time domain reflectometry (TDR) technique using the plurality of TDR probes, wherein the main processor may calculate a volumetric water content of the target ground on the basis of the relative permittivity.

In addition, the main processor may calculate the volumetric water content through Equation $\theta_v = a + b\varepsilon_r + c(\varepsilon_r)^2 + d(\varepsilon_r)^3$ (where, $\theta_v$ is the volumetric water content, $\varepsilon_r$ is the relative permittivity, and constants a, b, c, and d are dependent on the weight ratio of the metal component).

In addition, the main processor may calculate porosity of the target ground through Equation $\theta_v = nS$ (where, n is the porosity, and S is a degree of saturation of the target ground).

In addition, the main processor may calculate a gravimetric water content through Equation $$\theta_v = \omega \frac{\gamma_{dry}}{\gamma_w}$$

(where, ω is the gravimetric water content of the target ground, $\gamma_{dry}$ is a unit weight of a dry soil component, and $\gamma_w$ is a unit weight of a water component).

The device for evaluating characteristics of a target ground containing a metal component may further include: a compressional wave transmitting transducer installed on any one side of the pair of side frames and transmitting a compressional wave to the target ground; a compressional wave receiving transducer installed on the other side of the pair of side frames and receiving the compressional wave transmitted from the compressional wave transmitting transducer; a shear wave transmitting transducer installed on any one side of the pair of side frames and transmitting a shear wave to the target ground; a shear wave receiving transducer installed on the other side of the pair of side frames and receiving the shear wave transmitted from the shear wave transmitting transducer; and an elastic wave speed measurement part for measuring speed of the compressional wave and speed of the shear wave, which are propagating through the target ground, by using the compressional wave and the shear wave, which are respectively supplied by the compressional wave transmitting transducer and the shear wave transmitting transducer, and respectively received by the compressional wave receiving transducer and the shear wave receiving transducer, wherein the main processor may calculate porosity of the target ground in which a soil component, the metal component, and a water component are reflected, on the basis of the speed of the compressional wave, the speed of the shear wave, and the volume ratio of the metal component.

In addition, the main processor may calculate the porosity through Equation $$n = \frac{B_{g-IS}^2 B_f - B_{sk} B_f B_{g-IS} - B_f B_{g-IS} B_{mix} + B_{sk} B_f B_{mix}}{B_{g-IS}^2 B_{mix} + B_{sk} B_f B_{g-IS} - B_f B_{g-IS} B_{mix} - B_{sk} B_{g-IS}^2}$$

(where, n is the porosity, $B_{g-IS}$ is a bulk modulus of elasticity of a solid mixture composed of the metal component and the soil component, $B_f$ is a bulk modulus of elasticity of the water component, $B_{sk}$ is a bulk modulus of elasticity between particles of the solid mixture, and $B_{mix}$ is a bulk modulus of elasticity of the target ground containing the soil component, the metal component, and the water component), may calculate $B_{g-IS}$ and $B_{sk}$ on the basis of the volume ratio of the metal component, and may calculate $B_{mix}$ on the basis of the speed of the compressional wave and the shear wave.

In addition, the main processor may calculate $B_{g-IS}$ through Equation $B_{g-IS} = B_{g-I}f + B_{g-S}(1-f)$ (where, f is the volume ratio of the metal component, $B_{g-I}$ is a bulk modulus of elasticity of the metal component, $B_{g-S}$ is a bulk modulus of elasticity of the soil component), calculates $B_{sk}$ through Equation $B_{sk} = B_{sk-I}f + B_{sk-S}(1-f)$ (where, $B_{sk-I}$ is a bulk modulus of elasticity between particles of the metal component, and $B_{sk-S}$ is a bulk modulus of elasticity between particles of the soil component), and may calculate $B_{mix}$ through Equation $$B_{mix} = \rho_{mix}\left(V_{P,mix}^2 - \frac{4}{3}V_{S,mix}^2\right)$$

(where, $\rho_{mix}$ is density of the target ground containing the soil component, the metal component, and the water component, $V_{P,mix}$ is the speed of the compressional wave, and $V_{S,mix}$ is the speed of the shear wave).

The device for evaluating characteristics of a target ground containing a metal component may further include: a temperature sensor installed on the main frame and measuring a temperature of the target ground, wherein the electrode measurement part may measure a measured resistance value of the target ground on the basis of the power for the measurement applied to the plurality of electrodes installed to be exposed to the outside on the main frame, and may calculate a corrected resistance value obtained by correcting the measured resistance value on the basis of the temperature detected by the temperature sensor, and the main processor may calculate mixed electrical conductivity of the target ground containing the metal component, a soil component, and a water component on the basis of the corrected resistance value and the volume ratio of the metal component, and may calculate porosity of the target ground on the basis of the mixed electrical conductivity and the volume ratio of the metal component.

In addition, the main processor may calculate the porosity through Equation $\sigma_{mix} = \delta(1-n)f\sigma_I + n\sigma_{el}$ (where, $\sigma_{mix}$ is the mixed electrical conductivity, δ is a fitting constant, f is the volume ratio of the metal component, n is the porosity, $\sigma_I$ is electrical conductivity of the metal component, and $\sigma_{el}$ is electrical conductivity of the water component).

Advantageous Effects

According to an exemplary embodiment of the present disclosure based on the above configuration, in evaluating characteristics of a target ground containing a metal component, there is provided a device for evaluating the characteristics of the target ground containing the metal component, the device being able to more accurately evaluate the characteristics by means of reflecting the presence of the metal component and the amount of the metal component.

BEST MODE

Figure 1:
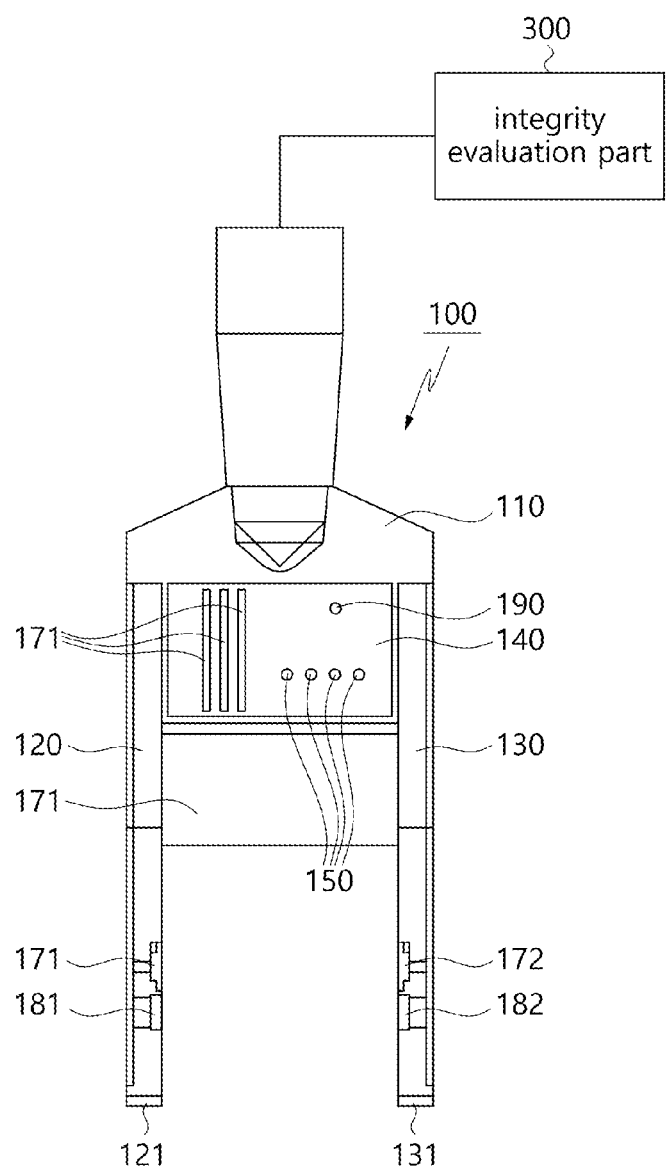
FIG. 1 is a view showing a configuration of a device for evaluating characteristics of a target ground containing a metal component according to an exemplary embodiment of the present disclosure.

The present disclosure relates to a device for evaluating characteristics of a target ground containing a metal component, the device including: a main frame; a penetration probe having a pair of side frames respectively installed at opposite side ends of the main frame and having a lower end thereof extending downward from the main frame; a plurality of electrodes installed to be exposed to outside on the main frame; an electrode measurement part for measuring apparent chargeability of the target ground by applying power for measurement to the plurality of electrodes; and a main processor for calculating a weight ratio of a metal component of the target ground on the basis of the apparent chargeability measured by the electrode measurement part and calculating a volume ratio of the metal component of the target ground on the basis of the calculated weight ratio of the metal component.

MODE FOR INVENTION

Advantages and features of the present disclosure and the methods of achieving the same will become apparent with reference to an exemplary embodiment described below in detail in conjunction with the accompanying drawings. However, the present disclosure is not limited to the exemplary embodiment disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

Hereinafter, with reference to the accompanying drawings, the exemplary embodiment according to the present disclosure will be described in detail.

FIG. 1 is a view showing a configuration of a device for evaluating characteristics of a target ground containing a metal component according to the exemplary embodiment of the present disclosure.

Referring to FIG. 1, the device for evaluating the characteristics according to the exemplary embodiment of the present disclosure may be configured to include a penetration probe 100.

The penetration probe 100 is a device that penetrates a target ground when exploring the characteristics of the target ground, and in the exemplary embodiment of the present disclosure, as an example, the penetration probe 100 includes a main frame 110 and a pair of side frame 120 and 130s.

Each of the pair of side frame 120 and 130s is installed at an end of each opposite side of the main frame 110. In addition, each of the pair of side frame 120 and 130s has a lower end thereof extending downward from the main frame 110, so as to have a structure in which when the penetration probe 100 penetrates a target ground, the pair of side frame 120 and 130s first penetrates the target ground before the main frame 110 penetrates the target ground.

Figure 2:
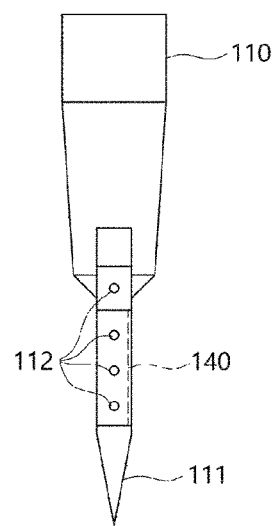
FIG. 2 is a view showing a side of a main frame according to the exemplary embodiment of the present disclosure.

FIG. 2 is a view showing a side of the main frame 110 according to the exemplary embodiment of the present disclosure. As shown in FIG. 2, due to a flat plate shape of the side, the friction with the target ground is minimized when the main frame 110 penetrates the target ground, and the penetration is possible with a relatively small force.

In addition, an inclined part is formed in a lower part region of the main frame 110, and as shown in FIG. 2, the inclined part is processed sharply like an ax blade, so as to minimize a disturbance generated by soil and the like constituting the target ground during penetration of the main frame 110, thereby enabling smooth entry of the penetration probe 100.

Meanwhile, a plurality of fastening holes 112 may be formed on the sides of the main frame 110. Through each fastening hole 112, each side frame 120 and 130 may be detachably coupled to each side of the main frame 110 by bolting.

In addition, the lower edge of each side frame 120 and 130 is formed with a sharp penetration tip 121 and 131 corresponding to the inclined part of the main frame 110, thereby enabling smooth entry when each side frame 120 and 130 penetrates the target ground.

The configuration of the penetration probe 100 according to the above-described exemplary embodiment is only an example, and the technical idea according to the present disclosure is not limited to the structure of the penetration probe 100 described above, and obviously, the configuration of the penetration probe 100 may be provided in various forms to which a structure of a sensor and a configuration of a integrity evaluation part 300 to be described later may be applied.

In addition, the device for evaluating the characteristics according to the exemplary embodiment of the present disclosure may include a plurality of electrodes 150.

As shown in FIG. 1, the plurality of electrodes 150 is installed to be exposed to the outside on the main frame 110. In the exemplary embodiment of the present disclosure, as shown in FIG. 1, four electrodes 150 are installed, as an example.

In the exemplary embodiment of the present disclosure, for example, the plurality of electrodes 150 is installed on a sensor plate 140, and the sensor plate 140 is mounted on the main frame 110, and thus the plurality of electrodes 150 are installed on the main frame 110. Here, as shown in FIG. 2, the sensor plate 140 is installed inside the main frame 110 so as to be inserted inward from the plate surface of the main frame 110, thereby preventing separation from the main frame 110 when the main frame 110 penetrates the ground.

Figure 3:
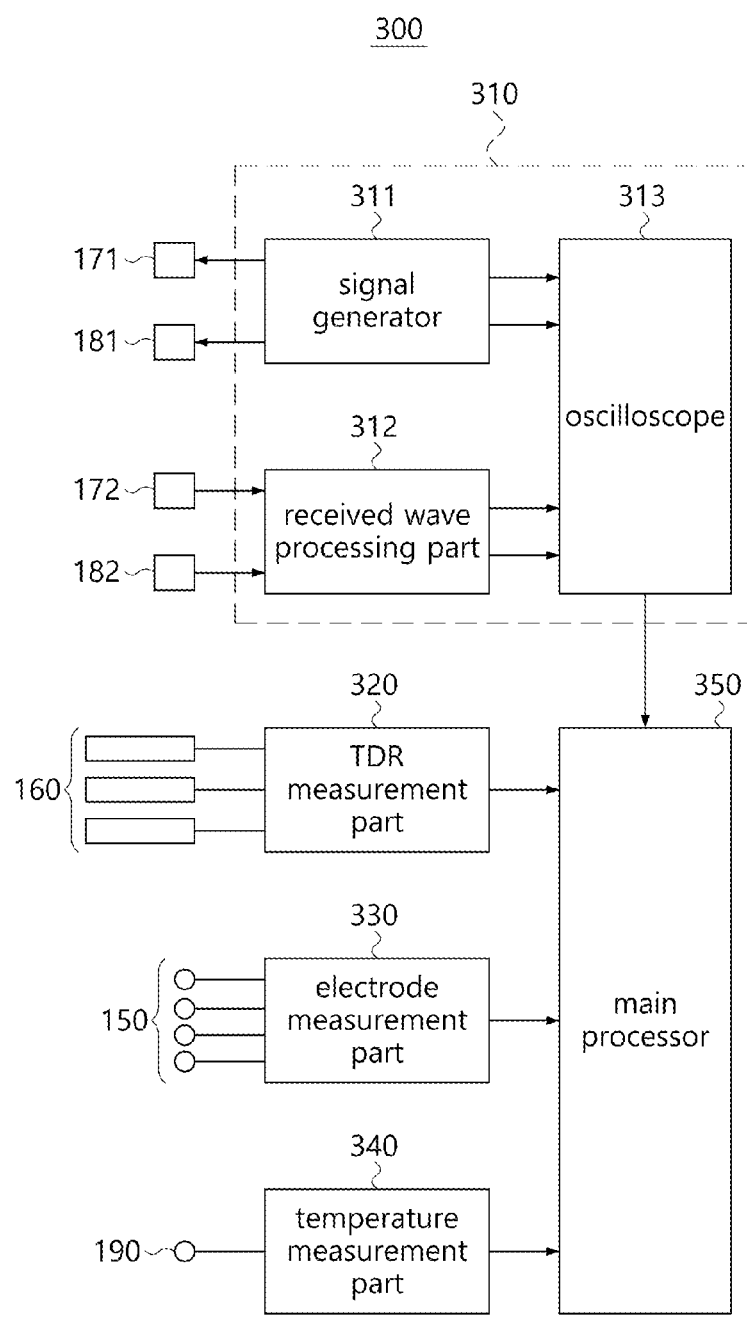
FIG. 3 is a view showing an example of a control block diagram of an integrity evaluation part according to the exemplary embodiment of the present disclosure.

The device for evaluating the characteristics according to the exemplary embodiment of the present disclosure may be configured to further include a integrity evaluation part 300, as shown in FIG. 1. FIG. 3 is a view showing an example of a control block diagram of the integrity evaluation part 300 according to the exemplary embodiment of the present disclosure.

Referring to FIG. 3, the integrity evaluation part 300 according to the exemplary embodiment of the present disclosure may include an electrode measurement part 330 and a main processor 350.

The electrode measurement part 330 measures apparent chargeability of a target ground by applying power for measurement to the plurality of electrodes 150. In the exemplary embodiment of the present disclosure, for example, the electrode measurement part 330 applies the power for measurement to the four electrodes 150 and measures the apparent chargeability through the time domain induced polarization probe method.

More specifically, the electrode measurement part 330 applies the power for measurement to two of the four electrodes 150, for example, two electrodes 150 respectively positioned at opposite outer sides of the electrode measurement part 330. Then, the voltage between two inner side electrodes 150 is detected.

Here, when the electrode measurement part 330 applies the power for measurement and then cuts off the power, the two electrodes 150 positioned at the inner sides of the electrode measurement part 330 detect the voltage for a predetermined period of time due to some power charged in the target ground even after the power is cut off, and the electrode measurement part 330 uses this phenomenon and is able to measure the apparent chargeability of the target ground.

Here, the apparent chargeability varies depending on conductive particles in the target ground, for example, a metal component in the target ground, so in the exemplary embodiment of the present disclosure, the main processor 350 calculates a weight ratio of the metal component on the basis of the apparent chargeability measured by the electrode measurement part 330, and a volume ratio of the metal component of the target ground is calculated on the basis of the calculated weight ratio of the metal component.

Hereinafter, the principle of calculating a volume ratio of a metal component of a target ground by using the apparent chargeability will be described.

In general, in calculating the integrity of the target ground containing the metal component, for example, the porosity which is a degree of weakness, the volume ratio of particles constituting the target ground is important, so the measurement of the volume ratio of the metal component of the target ground is important for evaluating the characteristics of the target ground.

Here, the volume ratio of the metal component in the target ground composed of the metal component and a soil component may be expressed as [Equation 1].

$$f = \frac{V_I}{V_I + V_S} \quad \text{[Equation 1]}$$

In [Equation 1], f is the volume ratio of the metal component, $V_I$ is a volume of the metal component, and $V_S$ is a volume of the soil component.

Similarly, a weight ratio of the metal component of the target ground may be expressed as [Equation 2].

$$IC = \frac{W_I}{W_I + W_S} \quad \text{[Equation 2]}$$

In [Equation 2] IC is the weight ratio of the metal component, $W_I$ is a weight of the metal component, $W_S$ is a weight of the soil component.

Figure 4:
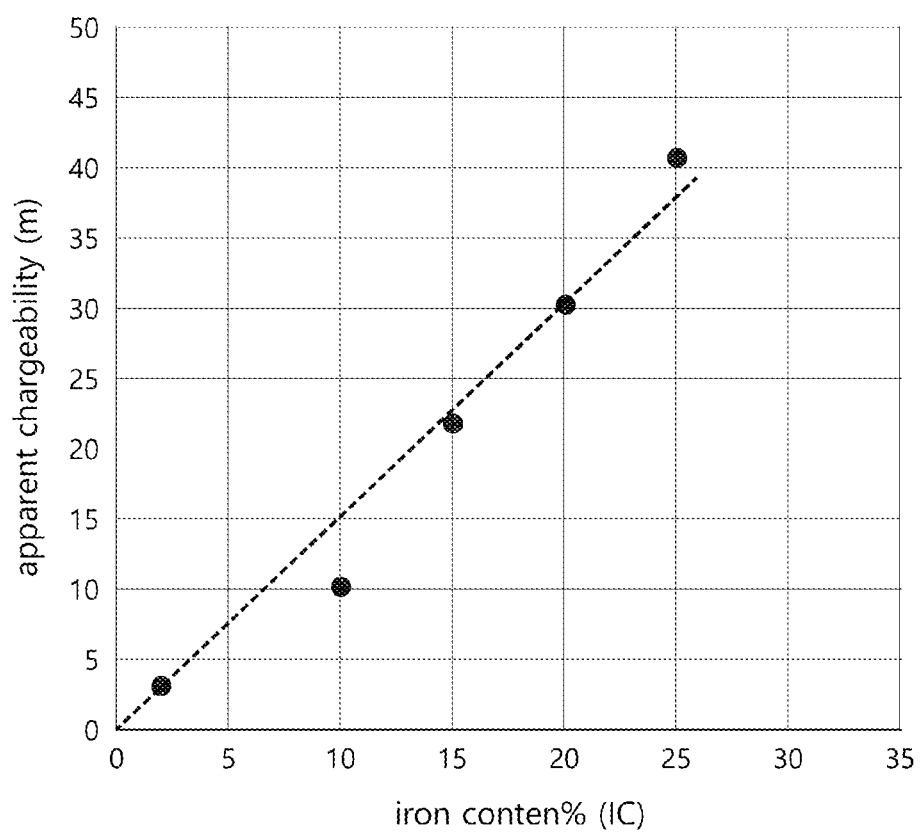
FIG. 4 is a view for explaining a relationship between apparent chargeability and a weight ratio of the metal component in the device for evaluating the characteristics of the target ground containing the metal component according to the exemplary embodiment of the present disclosure.

Here, the weight ratio of the metal component is dependent on the type of the metal component and proportional to the apparent chargeability. This relationship was derived through results of an apparent chargeability test conducted by means of allowing various amounts of the metal component to be contained in the soil component. FIG. 4 is a view showing an example of the test using an iron component, and it may be seen that the apparent chargeability and the weight ratio of the metal component are proportional.

Based on the results of such a test, the apparent chargeability of a target ground and the weight ratio of a metal component of the target ground may be expressed as [Equation 3].

$$m = k \cdot IC \quad \text{[Equation 3]}$$

In [Equation 3], M is the apparent chargeability, and k is a slope of a proportional relationship. Here, since the slope k varies depending on the type of a metal component, it is preferable to derive and store values of the slope k according to various types of metals through tests prior to an application of the present disclosure.

As described above, when a weight ratio of a metal component of a target ground is calculated, the main processor 350 calculates a volume ratio of the metal component on the basis of the weight ratio of the metal component.

The process of deriving the volume ratio of the metal component from the weight ratio of the metal component will be described as follows.

First, the total unit weight of the ground containing the metal component and the soil component may be expressed as [Equation 4].

$$\gamma_{Solid} = \frac{W}{V} = \frac{W_S + W_I}{V_S + V_I} = \frac{\gamma_S V_S + \gamma_I V_I}{V_S + V_I} \quad \text{[Equation 4]}$$

In [Equation 4], $\gamma_{Solid}$ is the total unit weight, $\gamma_S$ is a unit weight of the soil component, and $\gamma_I$ is a unit weight of the metal component.

[Equation 4] may be arranged as in [Equation 5].

$$V_I = \frac{\gamma_{Solid} - \gamma_{Soil}}{\gamma_I - \gamma_{Soil}} V_S \quad \text{[Equation 5]}$$

When the concept of specific gravity is introduced into [Equation 5], a derivation process such as [Equation 6] may be deduced.

$$V_I = \frac{\gamma_{Solid} - \gamma_{Soil}}{\gamma_I - \gamma_{Soil}} V_S \times \frac{1/\gamma_w}{1/\gamma_w} = \frac{G_{mix} - G_S}{G_I - G_{mix}} V_S \quad \text{[Equation 6]}$$

-continued $$W_I = \frac{G_{mix} - G_S}{G_I - G_{mix}} \frac{G_I}{G_S} W_S = \frac{V_I}{V_S} \frac{G_I}{G_S} W_S \rightarrow \frac{W_I}{W_S} = \frac{V_I}{V_S} \frac{G_I}{G_S}$$

$$IC = \frac{W_I}{W_I + W_S} = \frac{1}{1 + \frac{W_S}{W_I}} \rightarrow \frac{W_S}{W_I} = \frac{1}{IC} - 1$$

$$f = \frac{V_I}{V_I + V_S} = \frac{1}{1 + \frac{V_S}{V_I}} = \frac{1}{1 + \frac{W_S}{W_I} \frac{G_I}{G_S}} = \frac{1}{1 + \left(\frac{1}{IC} - 1\right) \frac{G_I}{G_S}}$$

In [Equation 6], $G_{mix}$ may be expressed as a specific gravity $$\frac{\gamma_{Solid}}{\gamma_w}$$

of a mixture of the soil component and the metal component, $G_S$ may be expressed as a specific gravity $$\frac{\gamma_{Soil}}{\gamma_w}$$

of the soil component, and $G_I$ may be expressed as a specific gravity $$\frac{\gamma_I}{\gamma_w}$$

of the metal component, where $\gamma_w$ is a unit weight of water.

Through the derivation process, a volume ratio of a metal component may be expressed as [Equation 7], and the volume ratio of the metal component may be calculated through applying a weight ratio of the metal component calculated above. In other words, it is possible to measure the volume ratio of the metal component through measurement of the apparent chargeability of the target ground at a site.

$$f = \frac{1}{1 + \left(\frac{1}{IC} - 1\right) \frac{G_I}{G_S}} \quad \text{[Equation 7]}$$

In [Equation 6] and [Equation 7], f is the volume ratio of the metal component.

Through the above process, the volume ratio of the metal component is calculated in the target ground containing the metal component, and by using this volume ratio, it is possible to evaluate the characteristics in which the metal component is reflected in the evaluation of the characteristics of the target ground.

Referring back to FIGS. 1 and 3, the device for evaluating the characteristics according to the exemplary embodiment of the present disclosure may include a plurality of TDR probes 160. Each TDR probe 160 is installed to be exposed to the outside on the main frame 110, and like the electrodes 150 described above, for example, each TDR probe 160 is installed on the main frame 110 while being installed on the sensor plate 140.

In addition, as shown in FIG. 3, the main processor 350 may be configured to further include a TDR measurement part 320. The TDR measurement part 320 measures a relative permittivity of the target ground through a time domain reflectometry (TDR) technique using the plurality of TDR probes 160. Here, since the method of measuring the relative permittivity of the target ground using the TDR probe 160 is already known, a detailed description thereof will be omitted.

The main processor 350 calculates a volumetric water content of the target ground on the basis of the relative permittivity measured through the TDR measurement part 320. Here, in the exemplary embodiment of the present disclosure, for example, the main processor 350 calculates the volumetric water content of the target ground through [Equation 8].

$$\theta_v = a + b\varepsilon_r + c(\varepsilon_r)^2 + d(\varepsilon_r)^3 \quad \text{[Equation 8]}$$

In [Equation 8], $\theta_v$ is the volumetric water content, and $\varepsilon_r$ is the relative permittivity. In addition, constants a, b, c, and d are dependent on the weight ratio of the metal component. In other words, each value of the constants a, b, c, and d varies depending on the weight ratio of the metal component. In a state where the constant values according to the weight ratio of the metal component are measured and stored in advance, each constant corresponding to the weight ratio of the metal component calculated through the measurement of the apparent chargeability in the above-described process is extracted, and then is substituted into [Equation 8], so that the volumetric water content of the target ground may be calculated using the relative permittivity measured through the TDR technique.

Here, the volumetric water content calculated through [Equation 8] or the weight ratio of the metal component calculated through the apparent chargeability are reflected, whereby the reflected value of the metal component contained in the target ground may be calculated.

In addition, the main processor 350 may calculate porosity of the target ground through [Equation 9], by using the volumetric water content calculated through [Equation 8].

$$\theta_v = nS \quad \text{[Equation 9]}$$

In [Equation 9], n is the porosity, and S is a degree of saturation of a target ground. In this case, when the degree of saturation of the target ground is assumed to be "1", the porosity of the target ground may be calculated through the volumetric water content, and it is possible to measure the degree of weakness or whether the target ground is weak or not.

In addition, the main processor 350 may calculate a gravimetric water content of the target ground through [Equation 10].

$$\theta_v = \omega \frac{\gamma_{dry}}{\gamma_w} \quad \text{[Equation 10]}$$

In [Equation 10], $\omega$ is the gravimetric water content of the target ground, $\gamma_{dry}$ is a unit weight of a dry soil component, and $\gamma_w$ is a unit weight of a water component.

As described above, by using the relative permittivity measured through the TDR technique, the volumetric water content, porosity, and gravimetric water content of the target ground may be calculated. In this case, the metal component included in the target ground is reflected in the process of calculating the volumetric water content, so that it is possible to accurately evaluate the characteristics in which the metal component is reflected.

Referring back to FIGS. 1 and 3, the device for evaluating the characteristics according to the exemplary embodiment of the present disclosure may be configured to further include a compressional wave transmitting transducer 171, a compressional wave receiving transducer 172, a shear wave transmitting transducer 181, and a shear wave receiving transducer 181.

As shown in FIG. 1, the compressional wave transmitting transducer 171 is installed on any one side of the pair of side frame 120 and 130*s*, and transmits a compressional wave toward the opposite side of the pair of side frame 120 and 130*s*.

The compressional wave receiving transducer 172 is installed on a side frame 120 and 130 opposite to the side frame 120 and 130 in which the compressional wave transmitting transducer 171 is installed. In addition, the compressional wave receiving transducer 172 receives the compressional wave transmitted from the compressional wave transmitting transducer 171.

As shown in FIG. 1, the shear wave transmitting transducer 181 is installed on any one side of the pair of side frame 120 and 130*s*, and transmits a shear wave toward the other side of the pair of side frame 120 and 130*s*.

The shear wave receiving transducer 181 is installed on a side frame 120 and 130 opposite to the side frame 120 and 130 in which the shear wave transmitting transducer 181 is installed. In addition, the shear wave receiving transducer 181 receives the shear wave transmitted from the shear wave transmitting transducer 181.

In the exemplary embodiment of the present disclosure, as shown in FIG. 1, for example, the compressional wave transmitting transducer 171 and the shear wave transmitting transducer 181 are installed in the same side frame 120 and 130, and the compressional wave receiving transducer 172 and the shear wave receiving transducer 181 are installed in the same side frame 120 and 130, but obviously, it is possible that the compressional wave transmitting transducer 171 and the shear wave receiving transducer 181 may be installed on the same side frame 120 and 130.

Referring to FIG. 3, the integrity evaluation part 300 may further include an elastic wave speed measurement part 310, as shown in FIG. 3.

The elastic wave speed measurement part 310 measures the speed of a compressional wave propagating through the target ground, that is, the compressional wave speed, by using the compressional wave supplied by the compressional wave transmitting transducer 171 and received by the compressional wave receiving transducer 172.

Similarly, the elastic wave speed measurement part 310 measures the speed of the shear wave propagating through the target ground, that is, the shear wave speed by using the shear wave supplied by the shear wave transmitting transducer 181 and received by the shear wave receiving transducer 181.

As shown in FIG. 3, the elastic wave speed measurement part 310 may include a signal generator 311, a received wave processing part 312, and an oscilloscope 313.

The signal generator 311 generates a compressional wave and a shear wave and supplies the waves to the compressional wave transmitting transducer 171 and the shear wave transmitting transducer 181, respectively. In addition, the received wave processing part 312 is connected to each of the compressional wave receiving transducer 172 and the shear wave receiving transducer 181, so as to process signals of the compressional wave and the shear wave, which are respectively received by the compressional wave receiving transducer 172 and the shear wave receiving transducer 181. Here, the received wave processing part 312 may include a filter that removes noise from the received compressional wave and shear wave, and an amplifier that amplifies a signal from which noise is removed.

The oscilloscope 313 is connected in parallel to each of the signal generator 311 and a signal processing part, generates signal waveforms of the compressional wave and shear wave that have passed through the target ground, and generates the signal waveforms of the compressional wave and shear wave that are output from the signal generator 311, thereby enabling to measure each speed of the compressional wave and the shear wave from the difference between the two signal waveforms.

Here, based on the compressional wave speed, the shear wave speed, and the volume content of the metal component measured by the electrode measurement part 330, the main processor 350 may calculate the porosity of the target ground in which the soil, metal, and water components are reflected.

In the exemplary embodiment of the present disclosure, for example, the main processor 350 calculates the porosity through [Equation 11].

$$n = \frac{B_{g-IS}^2 B_f - B_{sk}B_f B_{g-IS} - B_f B_{g-IS} B_{mix} + B_{sk}B_f B_{mix}}{B_{g-IS}^2 B_{mix} + B_{sk}B_f B_{g-IS} - B_f B_{g-IS} B_{mix} - B_{sk}B_{g-IS}^2} \quad \text{[Equation 11]}$$

In [Equation 11], n is the porosity, $B_{g-IS}$ is a bulk modulus of elasticity of a solid mixture composed of the metal component and the soil component, $B_f$ is a bulk modulus of elasticity of the water component, $B_{sk}$ is a bulk modulus of elasticity between particles of the solid mixture, that is, a skeleton modulus, and $B_{mix}$ is a bulk modulus of elasticity of target soil containing the soil component, the metal component, and the water component.

Here, $B_{g-IS}$ and $B_{sk}$ may be calculated based on the volume ratio of the metal component calculated using the apparent chargeability. In the exemplary embodiment of the present disclosure, for example, the main processor 350 calculates $B_{g-IS}$ and $B_{sk}$ through [Equation 12] and [Equation 13], respectively.

$$B_{g-IS} = B_{g-I}f + B_{g-S}(1-f) \quad \text{[Equation 12]}$$

$$B_{sk} = B_{sk-I}f + B_{sk-S}(1-f) \quad \text{[Equation 13]}$$

In [Equation 12] and [Equation 13], f is the volume ratio of the metal component calculated by using the apparent chargeability, $B_{g-I}$ is a bulk modulus of elasticity of the metal component, and $B_{g-S}$ is a bulk modulus of elasticity of the soil component. In addition, $B_{sk-I}$ is a bulk modulus of elasticity between particles of the metal component, that is, a skeleton modulus of the metal component, and $B_{sk-S}$ is a bulk modulus of elasticity between particles of the soil component.

In addition, for example, the main processor 350 calculates $B_{mix}$ by using [Equation 14].

$$B_{mix} = \rho_{mix}\left(V_{P,mix}^2 - \frac{4}{3}V_{S,mix}^2\right) \quad \text{[Equation 14]}$$

In [Equation 14], $\rho_{mix}$ is density of target soil containing the soil component, the metal component, and the water component, $V_{P,mix}$ is compressional wave speed, and $V_{S,mix}$ is shear wave speed.

As described above, by using the compressional wave speed, the shear wave speed, and the volume ratio of the metal component, which are measured in a field, it is possible to measure the porosity of groundwater level, that is, the porosity of a target ground containing the water component and the metal component.

Here, the main processor 350 may calculate $\rho_{mix}$ through [Equation 15].

$$\rho_{mix} = (1-n)\rho_g^{-IS} + nS\rho_w \quad \text{[Equation 15]}$$

In [Equation 15], n is the porosity, S is the degree of saturation of the target ground, $\rho_g^{-IS}$ is the density of the solid mixture containing the metal component and the soil component, and $\rho_w$ is the density of water.

As described above, the degree of saturation S of the target ground may be assumed to be 1, and the porosity in [Equation 15] may be applied with a value calculated through [Equation 9].

As another example, since the unknown is the porosity n in [Equation 15], the optimal porosity may be calculated by using a trial and error technique. In more detail, by inputting the porosity n as an arbitrary value in [Equation 15] to calculate $\rho_{mix}$, the porosity n of [Equation 11] is calculated through the technique. In addition, it is possible to calculate the optimum value n by repeatedly comparing the value n calculated through [Equation 11] with the arbitrary value.

Through the above process, it is possible to more accurately measure the porosity of the target ground containing the metal component, the water component, and the soil component.

Referring back to FIGS. 1 and 3, the device for evaluating the characteristics according to the exemplary embodiment of the present disclosure may further include a temperature sensor 190 installed on the main frame 110 to measure temperature of the target ground. Here, a temperature measurement part 340 of the integrity evaluation part 300 transmits a temperature value of the target ground to the main processor 350 on the basis of the result measured by the temperature sensor 190.

Here, apart from the measurement of the apparent chargeability through the time domain induced polarization probe method described above, the electrode measurement part 330 may measure a resistance value of the target ground (hereinafter referred to as "measured resistance value") on the basis of the power for measurement applied to the plurality of electrodes 150.

In addition, the electrode measurement part 330 may calculate a corrected resistance value obtained by correcting the measured resistance value on the basis of the temperature value detected by the temperature sensor 190. That is, since a resistance value of the target ground varies depending on the temperature, it is possible to more accurately evaluate the characteristics of the target ground by correcting the resistance value.

In addition, the main processor 350 may calculate electrical conductivity (hereinafter referred to as "mixed electrical conductivity") of the target ground containing the metal component, the soil component, and the water component on the basis of the corrected resistance value and the volume ratio of the metal component calculated through the apparent chargeability described above.

In addition, the main processor 350 may calculate the porosity of the target ground on the basis of the mixed electrical conductivity and the volume ratio of the metal component. In the exemplary embodiment of the present disclosure, for example, the main processor 350 calculates the porosity through [Equation 16].

$$\sigma_{mix} = \delta(1-n)f\sigma_1 + n\sigma_{el} \quad \text{[Equation 16]}$$

$\sigma_{mix}$ is the mixed electrical conductivity, $\delta$ is a fitting constant, f is the volume ratio of the metal component, n is the porosity, $\sigma_1$ is the electrical conductivity of the metal component, and $\sigma_{el}$ is the electrical conductivity of the water component.

As described above, through the measurement of the volume ratio of the metal component, it is possible to calculate the porosity of the target ground in various ways, and different ground characteristics other than the porosity are also calculated by reflecting the metal component, thereby enabling more accurate measurement.

Although exemplary aspects of the present disclosure have been described for illustrative purposes, those skilled in the art will appreciate that various modifications, additions and substitutions are possible, without departing from essential characteristics of the disclosure. Therefore, the exemplary embodiments disclosed in the present disclosure are not intended to limit the technical idea of the present disclosure but to describe the present disclosure, and the scope of the technical idea of the present disclosure is not limited by these exemplary embodiments. The scope of protection of the present disclosure should be interpreted by the following claims, and all technical ideas within the scope equivalent thereto should be construed as being included in the scope of the present disclosure.

INDUSTRIAL APPLICABILITY

The present disclosure may be applied to evaluate the characteristics of the target ground to be probed.

The invention claimed is:
1. A device for evaluating characteristics of a target ground containing a metal component, the device comprising:
   a penetration probe having a main frame and a pair of side frames respectively installed at opposite side ends of the main frame, wherein each side frame has a lower end thereof extending downward from the main frame;
   four electrodes installed on the main frame and exposed to outside on the main frame;
   an electrode measurement part for measuring apparent chargeability of the target ground; and
   a main processor for calculating a weight ratio of the metal component of the target ground on the basis of the apparent chargeability measured by the electrode measurement part and calculating a volume ratio of the metal component of the target ground on the basis of the calculated weight ratio of the metal component,
   wherein the electrode measurement part applies power for measurement to two electrodes among the four electrodes, and detects voltage between the other two electrodes, and then measures the apparent chargeability through a time domain induced polarization probe method using the detected voltage,
   wherein the weight ratio of the metal component is subjected to a type of the metal component, so as to be proportional to the apparent chargeability, and
   wherein the volume ratio of the metal component is calculated based on the weight ratio of the metal component, specific gravity of the metal component, and specific gravity of a soil component of the target ground.
2. The device of claim 1, wherein the main processor calculates the weight ratio of the metal component through Equation m=k·IC (where, m is the apparent chargeability, IC is the weight ratio of the metal component, and k is a constant that varies depending on the type of the metal component), and calculates the volume ratio of the metal component through Equation $$f = \frac{1}{1 + \left(\frac{1}{IC} - 1\right)\frac{G_I}{G_S}}$$

(where, f is the volume ratio of the metal component, $G_I$ is specific gravity of the metal component, and $G_S$ is specific gravity of the soil component).

3. The device of claim 1, further comprising:
   a plurality of TDR probes installed to be exposed to the outside on the main frame; and
   a TDR measurement part for measuring a relative permittivity of the target ground through the time domain reflectometry (TDR) technique using the plurality of TDR probes,
   wherein the main processor calculates a volumetric water content of the target ground on the basis of the relative permittivity.

4. The device of claim 3, wherein the main processor calculates the volumetric water content through Equation $\theta_v = a + b\varepsilon_r + c(\varepsilon_r)^2 + d(\varepsilon_r)^3$ (where, $\theta_v$ is the volumetric water content, $\varepsilon_r$ is the relative permittivity, and constants a, b, c, and d are dependent on the weight ratio of the metal component).

5. The device of claim 4, wherein the main processor calculates porosity of the target ground through Equation $\theta_v = nS$ (where, n is the porosity, and S is a degree of saturation of the target ground).

6. The device of claim 4, wherein the main processor calculates a gravimetric water content through Equation $$\theta_v = \omega \frac{\gamma_{dry}}{\gamma_w}$$

(where, $\omega$ is the gravimetric water content of the target ground, $\gamma_{dry}$ is a unit weight of a dry soil component, and $\gamma_w$ is a unit weight of a water component).

7. The device of claim 1, further comprising:
   a compressional wave transmitting transducer installed on any one side of the pair of side frames and transmitting a compressional wave to the target ground;
   a compressional wave receiving transducer installed on the other side of the pair of side frames and receiving the compressional wave transmitted from the compressional wave transmitting transducer;
   a shear wave transmitting transducer installed on any one side of the pair of side frames and transmitting a shear wave to the target ground;
   a shear wave receiving transducer installed on the other side of the pair of side frames and receiving the shear wave transmitted from the shear wave transmitting transducer; and
   an elastic wave speed measurement part for measuring speed of the compressional wave and speed of the shear wave, which are propagating through the target ground, by using the compressional wave and the shear wave, which are respectively supplied by the compressional wave transmitting transducer and the shear wave transmitting transducer, and respectively received by the compressional wave receiving transducer and the shear wave receiving transducer, wherein the main processor calculates porosity of the target ground in which a soil component, the metal component, and a water component are reflected, on the basis of the speed of the compressional wave, the speed of the shear wave, and the volume ratio of the metal component.

8. The device of claim 7, wherein the main processor calculates the porosity through Equation $$n = \frac{B_{g-IS}^2 B_f - B_{sk} B_f B_{g-IS} - B_f B_{g-IS} B_{mix} + B_{sk} B_f B_{mix}}{B_{g-IS}^2 B_{mix} + B_{sk} B_f B_{g-IS} - B_f B_{g-IS} B_{mix} - B_{sk} B_{g-IS}^2}$$

(where, n is the porosity, $B_{g-IS}$ is a bulk modulus of elasticity of a solid mixture composed of the metal component and the soil component, $B_f$ is a bulk modulus of elasticity of the water component, $B_{sk}$ is a bulk modulus of elasticity between particles of the solid mixture, and $B_{mix}$ is a bulk modulus of elasticity of the target ground containing the soil component, the metal component, and the water component), may calculate $B_{g-IS}$ and $B_{sk}$ on the basis of the volume ratio of the metal component, and may calculate $B_{mix}$ on the basis of the speed of the compressional wave and the shear wave.

9. The device of claim 8, wherein the main processor calculates $B_{g-IS}$ through Equation $B_{g-IS} = B_{g-I}f + B_{g-S}(1-f)$ (where, f is the volume ratio of the metal component, $B_{g-I}$ is a bulk modulus of elasticity of the metal component, $B_{g-S}$ is a bulk modulus of elasticity of the soil component), calculates $B_{sk}$ through Equation $B_{sk} = B_{sk-I}f + B_{sk-S}(1-f)$ (where, $B_{sk-I}$ is a bulk modulus of elasticity between particles of the metal component, and $B_{sk-S}$ is a bulk modulus of elasticity between particles of the soil component), and may calculate $B_{mix}$ through Equation $$B_{mix} = \rho_{mix}\left(V_{P,mix}^2 - \frac{4}{3}V_{S,mix}^2\right)$$

(where, $\rho_{mix}$ is density of the target ground containing the soil component, the metal component, and the water component, $V_{P,mix}$ is the speed of the compressional wave, and $V_{S,mix}$ is the speed of the shear wave).

10. The device of claim 1, further comprising:
    a temperature sensor installed on the main frame and measuring a temperature of the target ground,
    wherein the electrode measurement part measures a measured resistance value of the target ground on the basis of the power for the measurement applied to the plurality of electrodes installed to be exposed to the outside on the main frame, and calculates a corrected resistance value obtained by correcting the measured resistance value on the basis of the temperature detected by the temperature sensor, and
    the main processor calculates mixed electrical conductivity of the target ground containing the metal component, a soil component, and a water component on the basis of the corrected resistance value and the volume ratio of the metal component, and calculates porosity of the target ground on the basis of the mixed electrical conductivity and the volume ratio of the metal component.

11. The device of claim 10, wherein the main processor may calculate the porosity through Equation $\sigma_{mix} = \delta(1-n)f\sigma_I + n\sigma_{el}$ (where, $\sigma_{mix}$ is the mixed electrical conductivity, $\delta$ is a fitting constant, f is the volume ratio of the metal component, n is the porosity, $\sigma_I$ is electrical conductivity of the metal component, and $\sigma_{el}$ is electrical conductivity of the water component).

\* \* \* \* \*